US008749640B2

(12) United States Patent
Williams (10) Patent No.: US 8,749,640 B2
(45) Date of Patent: Jun. 10, 2014

(54) BLUR-CALIBRATION SYSTEM FOR ELECTRO-OPTICAL SENSORS AND METHOD USING A MOVING MULTI-FOCAL MULTI-TARGET CONSTELLATION

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 443 days.

(21) Appl. No.: 13/271,155

(22) Filed: Oct. 11, 2011

(65) Prior Publication Data

US 2013/0088633 A1    Apr. 11, 2013

(51) Int. Cl.
*H04N 17/00* (2006.01)
*H04N 17/02* (2006.01)
*G03B 13/00* (2006.01)
*H04N 5/232* (2006.01)

(52) U.S. Cl.
USPC ............................ 348/188; 348/187; 348/345

(58) Field of Classification Search
CPC ... H04N 17/00; H04N 5/217; G01M 11/0264; G03B 19/00; G06T 7/0018; G06K 9/40
USPC .................. 348/345–357, 187–190; 382/255; 702/104
See application file for complete search history.

(56) References Cited

U.S. PATENT DOCUMENTS 6,285,799 B1 * 9/2001 Dance et al. .................. 382/261
7,463,753 B2   12/2008 Williams et al.
7,881,495 B2    2/2011 Williams et al.
7,920,982 B2    4/2011 Williams et al.
2009/0299674 A1 12/2009 Williams

OTHER PUBLICATIONS

Krist et al,. "20 years of Hubble Space Telescope optical modeling using Tiny Tim." European Southern Observatory, Karl Schwarzschild Str. 2, D-85748, Garching, Germany.
Gershberg et al., "A Practical Algorithm for the Determination of Phase from Image and Diffraction Plane Pictures," Cavendish Laboratory, Cambridge, England, pp. 237-246.
Krist et al., "Phase-retrieval analysis of pre- and post-repair Hubble Space Telescope images," Aug, 1, 1995, vol. 34, No. 22, Applied Optics, pp. 4951-4964.
Roddier et al., "Combined approach to the Hubble Space Telescope wave-front distortion analysis," Applied Optics, vol. 32, No. 16 , Jun. 1, 1993, pp. 2992-3008.

* cited by examiner

*Primary Examiner* — Sinh Tran
*Assistant Examiner* — Christopher K Peterson
(74) *Attorney, Agent, or Firm* — Eric A. Gifford (57) ABSTRACT

Blur-calibration of an imaging sensor includes moving a known target pattern across the field-of view (FOV) of the imaging sensor to present the target pattern across different frames at different pixel phases. The known target pattern comprises a plurality of point-like objects with fixed relative positions in which at least one point-like object has a different focus position. Frames of images of the moving target pattern as seen in the FOV of the imaging sensor are captured to sample point-like objects at different focus positions and generate a multi-focal image data output, which may be subsequently processed to generate data products at different focus positions from a high-resolution composite image generated from the captured frames.

20 Claims, 5 Drawing Sheets

BLUR-CALIBRATION SYSTEM FOR ELECTRO-OPTICAL SENSORS AND METHOD USING A MOVING MULTI-FOCAL MULTI-TARGET CONSTELLATION

GOVERNMENT RIGHTS

This invention was made with United States Government support under Contract Number HQ0276-10-C-0005 with the Missile Defense Agency (MDA). The United States Government has certain rights in this invention.

RELATED APPLICATIONS

This patent application is related to U.S. patent application entitled "BLUR-CALIBRATION SYSTEM FOR ELECTRO-OPTICAL SENSORS AND METHOD USING A MOVING MULTI-TARGET CONSTELLATION", Ser. No. 13/214,683, filed Aug. 22, 2011, the entire contents of which is incorporated by reference.

This patent application is related to U.S. patent application entitled "MOTIONLESS FOCUS EVALUATION TEST STATION FOR ELECTRO-OPTIC (EO) SENSORS", Ser. No. 13/073,661, filed Mar. 28, 2011, the entire contents of which is incorporated by reference.

This patent application is related to U.S. patent application entitled "OPTICAL DISTORTION CALIBRATION FOR ELECTRO-OPTICAL SENSORS", Ser. No. 13/021,729, filed Feb. 5, 2011, the entire contents of which is incorporated by reference.

TECHNICAL FIELD

Some embodiments pertain to imaging systems. Some embodiments pertain to blur-calibration of imaging sensors including electro-optical sensors. Some embodiments pertain to space-astronomy systems. Some embodiments pertain to kill vehicles and space systems.

BACKGROUND

One problem with imaging systems is the amount of image blur that is attributable to their optics and other components. The point-spread function (PSF) describes the response of the imaging system to a point target. The degree of broadening (blurring) of the PSF is a measure of the quality of the imaging system. Some applications require precision measurement of the system PSF to be made in-situ. This is extraordinarily difficult as it may require measuring an unresolved (near point) source at a resolution that is far higher than the pixel resolution. In some cases, it may also be necessary to measure the change in the PSF across the field-of-view (FOV) of an imaging sensor, compounding the blur-calibration problem.

In some cases, global parameter fits to a high-resolution composite image may be calculated, for example, using Zernike coefficients, to describe an input wavefront of a point-like object convolved with the active area of a pixel of the imaging system. Using Zernike coefficients, to describe an input which, when masked by optical system obscurations, ideally focused on the detector (collapsing phase and sensing power), and convolved with the detector spatial response, determines the observed image. That is, the wavefront characterizes the spatial phase across the input aperture of light coming from the source point-like object in a way that captures and characterizes the aberrations of the imaging system's optical system. The Zernike coefficients may be used to calculate the system PSF and change in the PSF across the FOV and other data products at a desired resolution and spacing. The Zernike coefficients are just one specific set of coefficients. Other coefficients based on different basis functions may also be used to describe the input wavefront and characterize the imaging system's optical aberrations.

To generate the high-resolution composite image, a controller may cause a target having a single point-like object (e.g. a pinhole) to move in the plane perpendicular to the optical axis of the system at different pixel phases across the field-of-view (FOV) of the imaging system while capturing a sequence of image frames. The sequence of image frames is then mapped to form the composite image.

However, when Zernike coefficients are calculated by fitting to the composited image there is an inherent sign ambiguity. The relative sign of the even and odd Zernike terms can be determined from the fit, the absolute sign cannot. This specifically causes a problem when interpolating Zernike coefficients from different spatial regions to determine the change in PSF across the FOV.

By comparing coefficient values fit at different focus positions, this ambiguity is removed. Inducing a known focus change induces a known change of sign in the focus term, which is even. Only one hypothesis for the absolute sign of both the even and odd coefficients will be consistent with the observed differences across multiple measurements.

To acquire data at different focus positions to remove the ambiguity, the controller causes the point target to move to different focus positions along the optical axis of the test system by translating the focus adjustment stage. At each position, the controller causes the point target to move in the plane to acquire data to generate the high-resolution composite image and compute the Zernike coefficients.

Data acquisition at multiple focus positions is time-consuming and expensive. Furthermore, final calibration of the imaging system is now dependent on the exact return of the focus adjustment stage to zero. It is generally preferred to leave test equipment focus adjustment absolutely unchanged after the test equipment is itself calibrated.

This blur-calibration problem is markedly more difficult in systems where the required precision or other conditions, such as operation in cryo-vacuum conditions, make it impractical to project precision collimated patterns that fill the sensor's entire FOV. Conventional approaches used to blur-calibrate electro-optic sensors in a cryo-vacuum chamber are time-consuming, expensive and limited in accuracy.

Thus there are general needs for systems and methods for improved blur-calibration of imaging sensors which reduce the cost and the calibration time and which increase the accuracy of the blur-calibration data. What are also needed are systems and methods for blur-calibration of imaging sensors suitable for use in cryo-vacuum conditions.

SUMMARY

Embodiments of a blur-calibration system for electro-optical sensors and method using a moving multi-focal multi-target constellation are generally described herein. In some embodiments, blur-calibration of an imaging sensor includes moving a known target pattern having a plurality of point-like objects with different focus positions across the FOV of the imaging sensor to present the target pattern across different frames at different pixel phases and capturing frames of images of the moving target pattern as seen in the FOV of the imaging sensor to sample the point-like objects at different focus positions and generate a multi-focal image data output. The multi-focal image data may be acquired while leaving the test equipment focus adjustment absolutely unchanged. The multi-focal image data output may be subsequently processed to generate data products at different focus positions from high-resolution composite images generated from the captured frames at different focus positions.

In some embodiments, the data products may be representative of coefficients of basis functions such as Zernike coefficients that describe the input wavefront and characterize the aberrations of the optical system, a shape of a point-spread function (PSF), change of the PSF across the FOV or a through-focus curve.

In some embodiments, the multi-focal multi-target constellation includes a plurality of point-like objects with fixed relative positions in the x-y plane across the target surface and constant position in the z direction perpendicular to the target surface. The target is tilted so that its z-axis is a few degrees off the optical axis of the test system. Tilting the target provides diversity in the positions of the point-like objects along the optical axis, hence different focus positions.

In some embodiments, the multi-focal multi-target constellation is positioned in the plane perpendicular to the optical axis of the test system. The multi-target constellation includes a plurality of point-like objects with fixed relative positions in the x-y plane across the target surface and different positions in the z direction perpendicular to the target surface. The target surface may have non-uniform surface relief in the z direction to provide diversity in the positions of the point-like objects along the optical axis, hence different focus positions. In an embodiment, a substantial majority (e.g. greater than 60% and suitably greater than 90%) of the point-like objects have the same position in the z direction, hence the same focus position. A few of the point-like objects (e.g. less than 40% and suitably less than 10%), sparsely distributed over the target, have a different position in the z direction, hence different focus positions.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
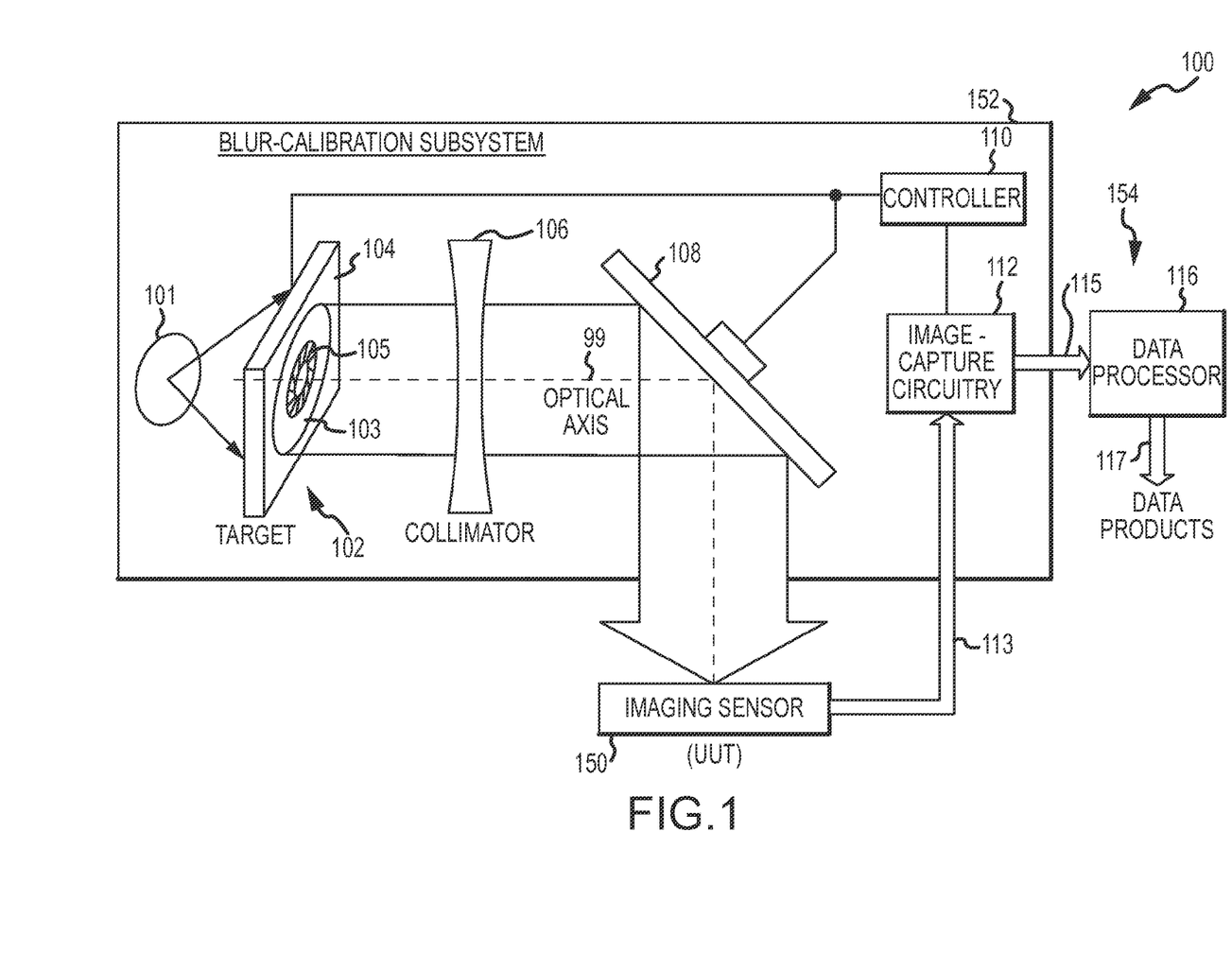
FIG. 1 illustrates a system for blur-calibration of an imaging sensor in accordance with some embodiments.

FIG. 1 illustrates a system for blur-calibration of an imaging sensor in accordance with some embodiments. System 100 may be configured for performing optical blur-calibration for an electro-optical sensor, such as imaging sensor 150. Imaging sensor 150 comprises both the sensor and the optics assembly that focuses collimated light onto the sensor. The system 100 may include a blur-calibration subsystem 152 to capture multi-focal image data from the imaging sensor 150 and a data processing subsystem 154 to process the multi-focal image data output 115 from the blur-calibration subsystem 152 to generate blur-calibration data for the imaging sensor 150 (i.e., the unit under test (UUT)). During assembly of the UUT, the sensor is nominally positioned at the focal plane of the optics assembly.

The blur-calibration subsystem 152 includes at least a light source 101 of electromagnetic (EM) radiation to which imaging sensor 150 is responsive (e.g. visible 0.4-0.7 um, NIR 0.7-1.1 um, SWIR 1.1-2.5 um, MWIR 3-5 um or LWIR 8-14 um), a multi-focal target 102, a projection element 106, a controller 110, and image-capture elements 112. Target 102, projection element 106 and imaging sensor 150 are arranged along and generally perpendicular to an optical axis 99 of the test system in the focus direction.

The target 102 may have a known target pattern 104 that comprises a constellation of point-like objects 103 with fixed relative positions, at least one of the point-like objects 103 having a different focus position along optical axis 99 in the focus direction. The spacing between point-like objects 103 having a different focus position may be widened to reduce interference between out of focus target images. Target 102 is may be positioned at a fixed focus position. In some embodiments, target 102 may be positioned at the focus of the test system. In some embodiments, target 102 may be positioned near the focus of the test system such that the target's different focus positions span the focus of the test system. In some embodiments, target 102 may be positioned away from the focus of the test system such that the target's different focus positions do not span the focus of the test system.

In some embodiments, the test equipment focus adjustment is left absolutely unchanged after the test equipment is itself calibrated. More specifically, the focus position of the target is left unchanged throughout the blur-calibration process. In general, the focus adjustment may be used to translate the target, components of the projection element or the imaging sensor along the optical axis to adjust focus. When target 102 has a "fixed focus position" none of the target, components of the projection element or imaging sensor are translated via the focus adjustment.

The projection element 106 may be configured to project at least a portion of the target pattern 104 within the FOV of the imaging sensor 150. The controller 110 may be configured to move the target pattern 104 across the FOV. The image-capture elements 112 may be configured to capture frames of images 113 of the moving target pattern 104 (i.e., frames of video) as seen in the FOV of the imaging sensor 150 to sample point-like objects at different focus positions and generate a multi-focal image data output 115. The controller 110 may be configured to cause the target pattern 104 to move across the FOV to present the target pattern 104 across different frames on different pixels and at different pixel phases.

The multi-focal image data output 115 from the image-capture elements 112 may be subsequently processed by a data processing element 116 to generate data products 117 at different focus positions from high-resolution composite images associated with the different focus positions generated from the captured frames. The data products may represent a through-focus curve, a shape of a point-spread function PSF, a change in the PSF as it moves across the FOV or coefficients of basis functions that describe an input wavefront such as Zernike coefficients. The data processing element 116 may be a data processing system or a computer system configured to process the multi-focal image data output 115 from the image-capture elements 112 as described in more detail below. In some embodiments, the data processing element 116 may be configured with software to process the image data output 115 generated from the image-capture elements 112.

In some embodiments, the image-capture elements 112 may comprise digital circuitry (CCDs) configured to image capture and image storage. In other the image-capture elements 112 may comprise an analog media such as film or magnetic media suitable for image capture and image storage.

The system 100 allows for blur-calibration of the imaging sensor 150 while the target 102 is in motion across the FOV thus providing a more efficient and accurate blur-calibration process. In accordance with some embodiments, the system 100 may be configured for performing optical blur-calibration for an imaging sensor 150 in a chamber, such as a cryo-vacuum chamber.

The system 100 allows for blur-calibration of the imaging sensor 150 while the target 102 has a fixed focus position along the optical axis thus leaving the test equipment focus adjustment absolutely unchanged after the test equipment is itself calibrated and throughout blur-calibration. The system 100 collects the multi-focal data required to disambiguate the coefficients without having to reposition the target, projection element or imaging sensor to change focus position.

The system 100 allows for generating a high-resolution composite image from captured frames for point-like objects at each different focus position.

The system 100 allows for generating the high-resolution composite image from captured frames with different approaches. In a first approach, a precision micro-actuation stage causes the target pattern to move across the FOV to known positions on a predefined grid in the x-y plane. In a second approach, which is described below in greater detail, the controller causes the target pattern to move across the FOV to unknown positions in an unconstrained manner. The actual positions of the target pattern are then measured in the sensed images. The sequence of captured frames is then mapped using either the known or measured positions of the target pattern to create the composite image.

In some embodiments, the data processing element 116 may be configured to determine an overall shift of the target pattern 104 across the FOV in each frame of video of the image data output 115. The point-like objects observed in each frame of video of the image data output 115 may be associated with corresponding point-like objects 103 of the target pattern 104 (since the target pattern 104 is a known target pattern). One or more sub-pixel resolution composite images may be generated for one or more of the point-like objects 103 by combining different images of the same point-like objects taken at the different pixel phases. One or more sub-pixel resolution composite images may be generated for point-like objects 103 at different focus positions. Each sub-pixel resolution composite image may be effectively placed within the high-resolution composite image according to its relative position, including its sub-pixel phase, of the point-like object 103 in that image. In these embodiments, the data processing element 116 may be configured to produce data products 117 representative of the Zernike coefficients and representative of a shape of the PSF from the composite image. The shape of the PSF represents the blur. The data products 117 that are produced are blur-calibration data for end-item use of the imaging sensor 150. The blur-calibration data may eliminate blur at one or more places in the FOV.

In some embodiments, the images of same point-like objects 103 are applied to (i.e., placed within) the composite image at the relative position of the object in that image (i.e., relative to the other images) to generate the composite images. In some embodiments, the system 100 may also be configured to utilize a neighborhood of samples to provide error reduction in the high-resolution composite image to create an approximation of a PSF for each point-like object. The use of the neighborhood of samples provides for noise reduction in the high-resolution composite image, as well as error reduction (i.e., slope times the registration error) in the composite image.

In some embodiments, multiple images of different point-like objects 103 of the same or different sizes may be included. In these embodiments, the relative offset of the objects may be known or may be calculated as a fit parameter. In these embodiments, each multiple image of each point-like object may be recorded.

The different pixel phases are different sub-pixel fractional positions of the point-like objects within each frame. The use of different sub-pixel fractional positions allows light to hit the pixels at different phases when scanned across the array. The combining of results from different pixels and source spots provides for high-collective phase diversity, effectively increasing the spatial sampling of the image sequence to far beyond the cameras native pixel-spacing resolution. In these embodiments, gains and offsets may be calculated as the target pattern 104 is scanned across different frames so that different pixels observe the same area of the target pattern 104.

In some embodiments, the blur-calibration system 152 may also include one or more mirrors, such as mirror 108. In these embodiments, the controller 110 may be configured to move the target pattern 104 across the FOV by controlling and tilting one or more of the mirrors. In some embodiments, the controller 110 may be configured to move the target pattern 104 across the FOV by controlling movement of the imaging sensor 150, rather than by controlling mirrors. In other embodiments, the target 102 itself may be controlled to cause the target pattern 104 across the FOV.

In some embodiments, the projection element 106 may comprise a collimator to collimate light rays to project at least a portion the target pattern 104 within the FOV of the imaging sensor 150. In these embodiments, the collimated light rays make it appear as if the target 102 is at or near infinity. In general, only a portion of the target pattern 104 may be projected with the FOV of the imaging sensor 150, as there is no requirement that the entire target pattern 104 stay within the FOV.

In some embodiments, the composite images at the different focus positions are processed to generate data products 117 at different focus positions.

In some embodiments, the multi-focal data products 117 that are produced by data processing element 116 may be blur-calibration data for end-item use of the imaging sensor 150. The blur-calibration data may specify a through-focus curve from which focus error of the UUT can be determined. The blur-calibration data may specify the shape of the blur at one or more places in the FOV. In some cases the effects of the size of the initial pinhole, relative to an idea point source, may be removed from the measures surface via de-convolution, often accomplished via a parametric fit to the remaining parameters to generate, for example. Zernike coefficients. In some embodiments, the blur-calibration data may specify the shape of the blur at every location in the FOV. Processing the multi-focal image data output to disambiguate the Zernike coefficients allows the coefficients to be correctly interpolated between different regions in the FOV. In general, the blur-calibration data may be manipulated to describe the PSF at some pre-determined location vs. where the actual point was sampled in test. In cases where the PSF is substantially constant across the FOV, this may not be necessary. In these embodiments, the blur-calibration data may be generated from a single data set (i.e., the multi-focal image data output 115).

Figure 2:
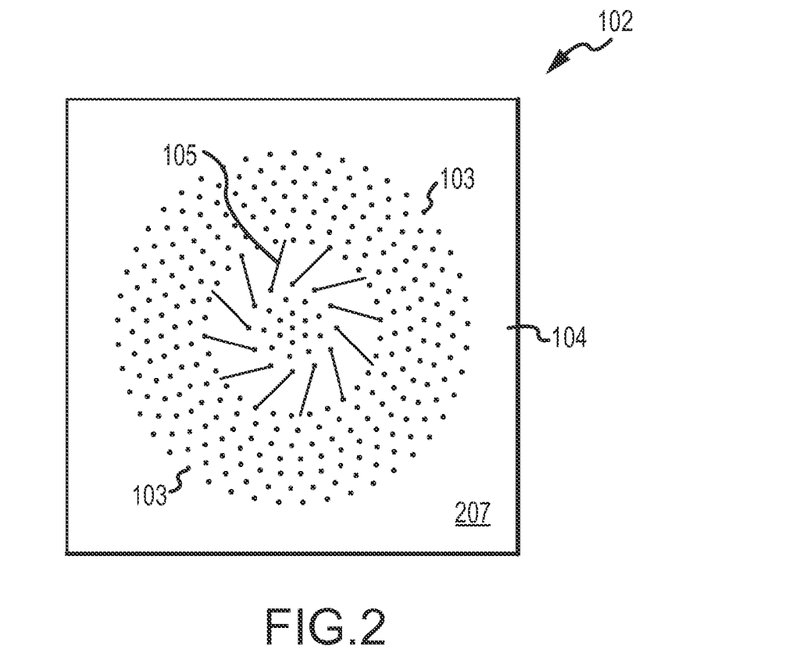
FIG. 2 is a target for use in blur-calibration of an imaging sensor accordance with some embodiments.

FIG. 2 is a multi-focal target for use in blur-calibration of an imaging sensor in accordance with some embodiments. Target 102 may correspond to target 102 (FIG. 1) and may have a known target pattern 104 that may comprise a plurality of point-like objects 103 with fixed relative positions in which at least one of the point-like objects 103 has a different focus position (e.g. different relative position in the focus direction along the optical axis of the test system). In some embodiments, the point-like objects 103 may comprise individual point sources of light that may be generated using a slide 207 with pinholes arranged in the target pattern 104 (e.g., a grid) and an infrared (IR) or visible light source behind the slide. The example embodiment shown in FIG. 2 uses a black body as a light source. In other embodiments, the light source may be a coherent.

Figure 3:
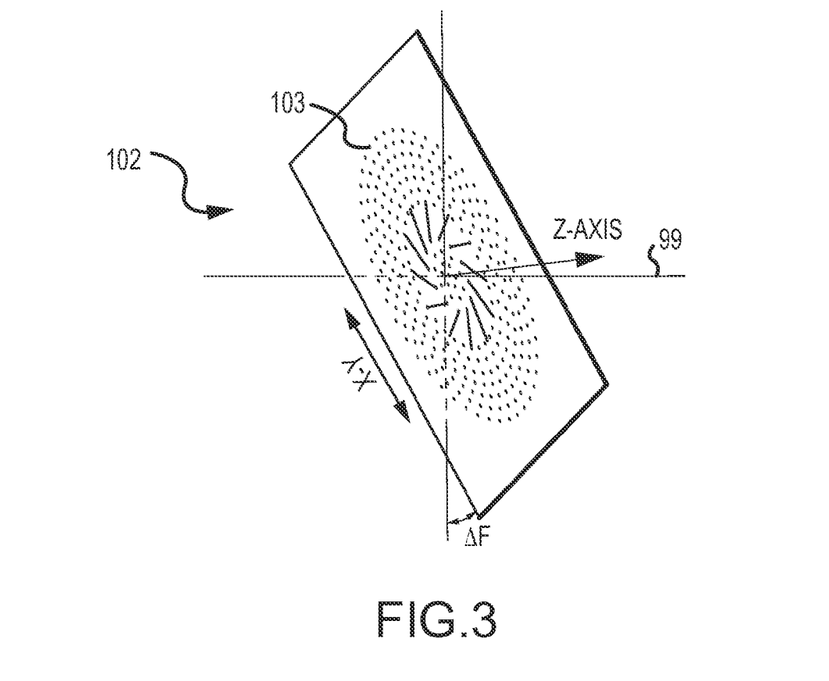
FIG. 3 illustrates tilting the target of FIG. 2 to provide a multi-focal multi-target constellation.

As shown in FIG. 3, the multi-focal target for use in blur-calibration of an imaging sensor in accordance with some embodiments is providing by tilting target 102 which may correspond to target 102 in FIGS. 1 and 2 with respect to the optical axis of the test system. Target 102 has a plurality of point-like objects 102 with fixed relative positions in the x-y plane across the target surface and constant position in the z direction perpendicular to the target surface. Target 102 is tilted so that its z-axis a few degrees of the optical axis 99 of the test system. Tilting target 102 creates diversity in the positions of the point-like objects along the optical axis, hence different focus positions. For example, point-like objects 103 on lines through target 102 along the x-axis will have the same focus position while point-like objects 103 on lines along the y-axis will have different focus positions. Depending on the known target pattern itself, tilting may produce a fairly uniform distribution of point-like objects across multiple different focus positions.

Figure 4:
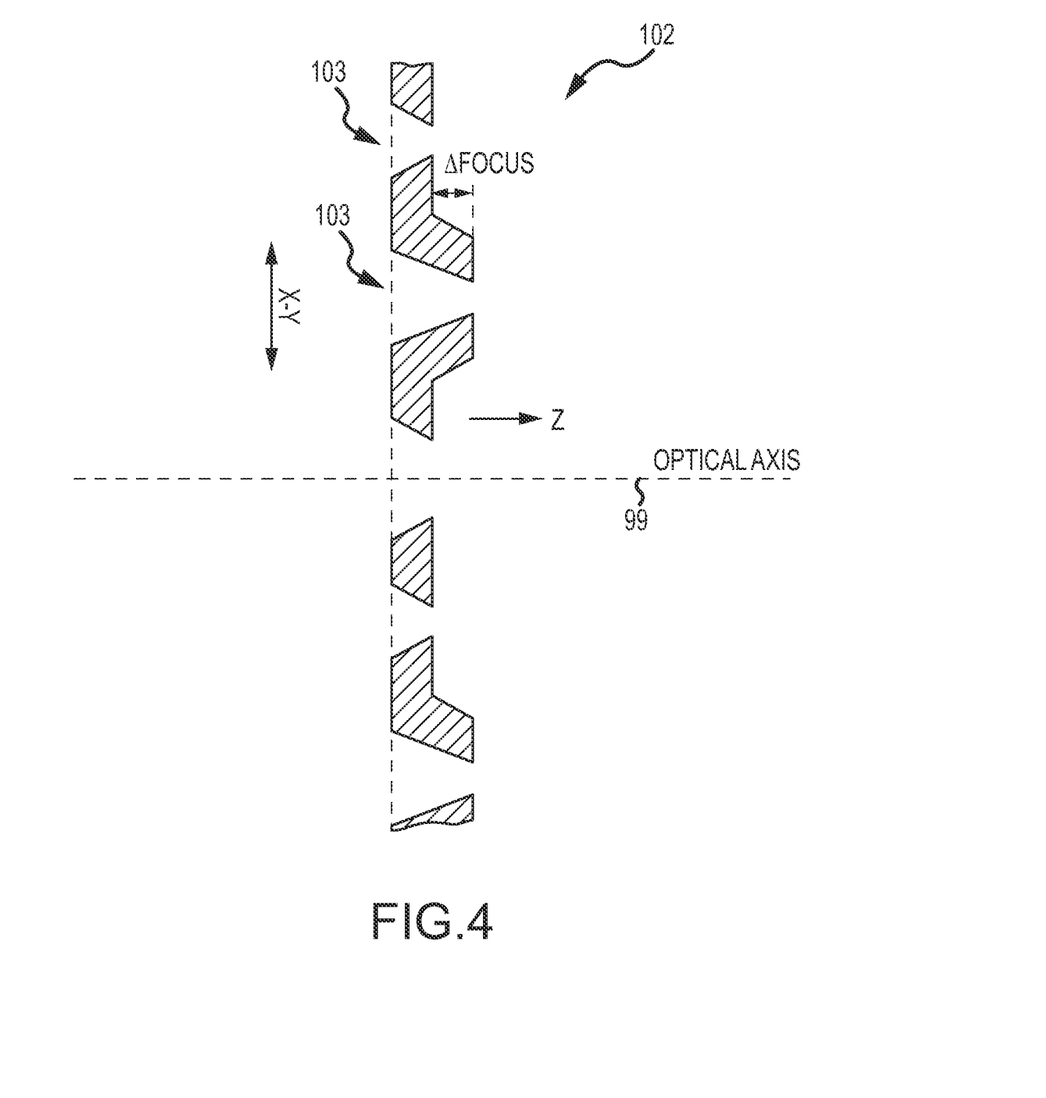
FIG. 4 is a section view of an embodiment of the target of FIG. 2 illustrating a non-uniform surface relief in the z direction to provide a multi-focal multi-target constellation.

As shown in FIG. 4, the multi-focal target for use in blur-calibration of an imaging sensor in accordance with some embodiments is providing by fabricating target 102 which may correspond to target 102 in FIGS. 1 and 2 with a non-uniform surface relief in the z direction so that the point-like objects have fixed relative positions in x, y and z. The non-uniform surface relief in the z direction provides diversity in the positions of the point-like objects along the optical axis, hence different focus positions. In an embodiment, a substantial majority (e.g. at least 60% and possibly greater than 90%) of the point-like objects have the same position in z. A few of the point-like objects (e.g. less than 40% and possibly less than 10%), sparsely distributed over the target, have a different z. This distribution may ensure a dense sampling of the point-like objects at one focus position in different regions over the FOV to calculate the data products. The few point-like objects may be used only to disambiguate the data products.

In some embodiments, the target pattern 104 may be an asymmetric pattern configured to allow an overall position to be determined from a sufficiently large sub-area of the pattern 104. In these embodiments, the target pattern 104 may comprise a plurality of unique sub-patterns.

In some embodiments, the point-like objects 103 of the target pattern 104 may comprise irregularly spaced points having a wider spacing near a center of the pattern 104 and a closer spacing further away from the center for increased phase diversity and coverage, although this is not a requirement.

In some embodiments, the target pattern 104 may comprise a number of slits 105 for increased phase diversity. The slits may be arranged in a circle and may be tilted or angled for increased coverage for horizontal and vertical scans as well as for improved conductive thermal transfer of radiative heat absorbed by the middle of the slide. In some embodiments, the target pattern 104 may comprise a prime number of slits 105, although this is not a requirement. In these embodiments, the slits 105 may provide resolved phase-diverse references to make it easier to accurately measure sub-pixel positions.

In some embodiments, the target pattern 104 may comprise hexagonal rings of the point-like objects 103. In some of these embodiments, the radius to each point may decrease linearly with the distance from the center. The use of hexagonal rings of the point-like objects 103 may help in associating the point-like objects 103 observed in each frame with corresponding point-like objects of the known target pattern 104.

In some embodiments, a chopper modulation may be applied to the target pattern 104 to modulate intensities of the point-like objects 103 as the target pattern 104 is moved across the FOV. The chopper modulation may comprise an on-off modulation in which the intensities of the point-like objects are turned on and off, although this is not a requirement. A chopper modulation may be used suppress the background of the slide 207 (i.e., portion of the target without the point-like objects). The use of chopper modulation may be needed because the background 207 is never perfectly zero or flat. In some embodiments, the controller 110 may control the application of a chopper modulation at the target 102.

In some embodiments, the system 100 may be configured to generate composite images of the moving target pattern by separately generating chopper-open and chopper-closed composite images from chopper-modulated frames of video to allow removal of a non-uniform slide background. The high-resolution composite images of the chopper-open may be aligned with chopper closed modulated frames. The aligned frames may be subtracted from each other to remove the effect of the slide background and capture the actual PSF. In these embodiments, chopping the moving target sequence and creating separate chopper-open and chopper-closed composite images allows the PSF to be determined from the difference between the chopper-open and chopper-closed composite images.

In some embodiments, the temporal phase of the chopper modulation in each frame may be identified by using an ensemble of the frames. Open, closed, and any in-transition images may also be identified and the identified in-transition images may be discarded. In these embodiments, the phase of the chopper waveform may be used to separate the chopper open and closed frames. In some alternate embodiments, intensity may also be used to separate chopper open and closed frames, although this is not a requirement.

In some embodiments, the position estimates of the individual images may be based on consistency with the composite image (i.e., by calculating fine adjustments to the image shifts). In some embodiments, adjustments to input image pixel biases may be calculated based on agreement with the composite image. In some embodiments, adjustments to the input image pixel relative gains may be calculated via agreement with the composite image. Adjustments to the overall image DC background over time may be calculated via agreement with the composite image.

In some embodiments, global parameter fits to the difference composite surface may be calculated, for example, using Zernike coefficients, to describe an input wavefront convolved with the active area of a pixel. Other types of coefficients than Zernike coefficients may be calculated to describe the input wavefront. These other coefficients use different basis functions than Zernike coefficients. However, like the Zernike coefficients they include both even and odd terms whose absolute signs must be disambiguated. These parameters may be used to calculate the data products 117 at a desired resolution and spacing.

In some embodiments, the Zernike coefficients may be calculated from the high-resolution composite images at each of the different focus positions. A comparison of the coefficients at different focus positions removes the ambiguity in the absolute sign of the coefficients. In some embodiments, all of the high-resolution composite images at the different focus positions are processed through a single simultaneous non-linear optimization to generate the disambiguated Zernike coefficients. In general, the later approach provides more accurate coefficients but is more computationally intensive. R. W. Gerchbert et al. "A Practical Algorithm for the Determination of Phase from Image and Diffraction Plane Pictures" OPTIK Vol. 35 (No. 2) pp. 237-246 (1972) describes techniques for calculation of Zernike coefficients.

In some embodiments, the disambiguated Zernike coefficients are interpolated between different regions of the FOV of the imaging sensor to generate one set of Zernike coefficients. This set of Zernike coefficients is used to generate the PSF over the FOV e.g. PSF (x,y).

In some embodiments, the multi-focal image data output 115 generated by the blur-calibration subsystem 152 may be stored for subsequent processing by the data processing subsystem 154. Although system 100, including the blur-calibration subsystem 152 and the data processing subsystem 154, is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of system 100 may refer to one or more processes operating on one or more processing elements.

Figure 5:
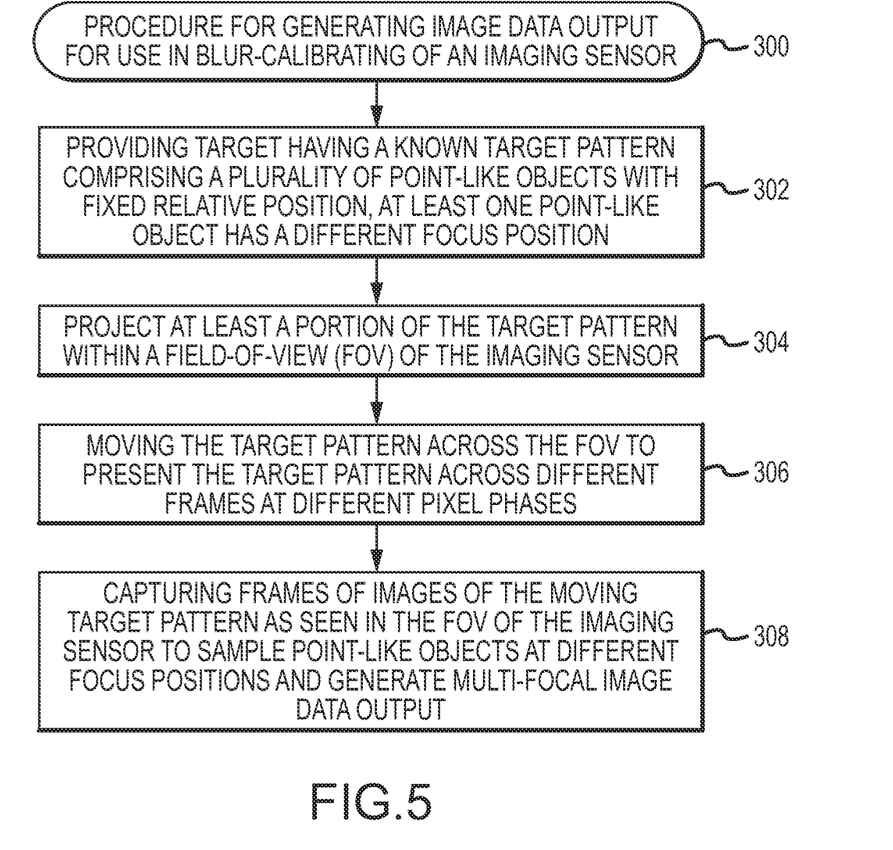
FIG. 5 is a procedure for generating multi-focal image data output for use in blur-calibration of an imaging sensor in accordance with some embodiments.

FIG. 5 is a procedure for generating a multi-focal image data output for use in blur-calibration of an imaging sensor in accordance with some embodiments. Procedure 300 may be performed by blur-calibration subsystem 152 (FIG. 1), although other subsystems may be configured to perform procedure 300. Procedure 300 may generate multi-focal image output data for use in blur-calibration of an imaging sensor, such as imaging sensor 150 (FIG. 1) for reducing and possibly eliminating blur at one or more locations in the FOV of the imaging sensor 150.

Operation 302 comprises providing a multi-focal target having a known target pattern 104 comprising a constellation of point-like objects 103 with fixed relative positions in which at least one point-like object 103 has a different focus position.

Operation 304 comprises projecting at least a portion of the target pattern 104 within the FOV of the imaging sensor 150.

Operation 306 comprises moving the target pattern 104 across the FOV to present the target pattern 104 across different frames at different pixel phases.

Operation 308 comprises capturing frames of images 113 of the moving target pattern 104 as seen in the FOV of the imaging sensor 150 to sample point-like objects at different focus positions and generating a multi-focal image data output 115. The multi-focal image data output may be processed by the data processing subsystem 154 (FIG. 1) or stored for later processing. The multi-focal image data output may be collected without changing the focus adjustment stage of the test system.

Figure 6:
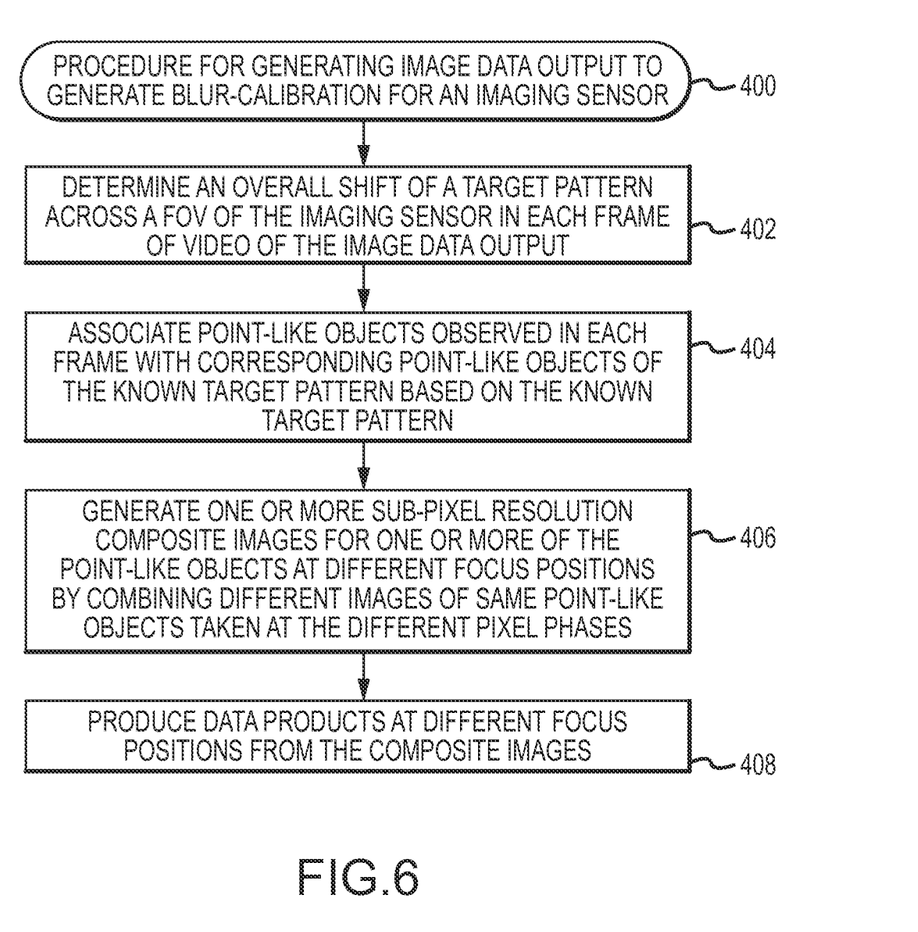
FIG. 6 is a procedure for processing multi-focal image data output to generate blur-calibration data for the imaging sensor in accordance with some embodiments.

FIG. 6 is a procedure for processing the multi-focal image data output to generate blur-calibration data for imaging sensor in accordance with some embodiments. This procedure is based on the free-form approach for generating the composite image. Alternately, the grid approach could be used. Procedure 400 may be performed by data processing subsystem 154 (FIG. 1), although other subsystems may be configured to perform procedure 400.

Operation 402 comprises determining an overall shift of the target pattern 104 across the FOV in each frame of video of the image data output 115.

Operation 404 comprises associating the point-like objects observed in each frame of video of the image data output 115 with corresponding point-like objects of the known target pattern 104 based on the known target pattern 104.

Operation 406 comprises generating one or more sub-pixel resolution composite images for one or more of the point-like objects 103 at each of at least two different focus positions by combining different images of the same point-like objects taken at the different pixel phases.

Operation 408 comprises producing data products 117 at different focus positions from the composite image. The data products may be representative of a through-focus curve from which optimum focus can be determined, a shape of the PSF, a shape of the PSF over the FOV or disambiguated coefficients of basis functions that describe an input wavefront such as Zernike coefficients. In some embodiments, a chopper modulation may be applied to the moving target sequence and separate chopper-open and chopper-closed composite images are created. The data products may be determined based at least in part on the difference between the chopper-open and chopper-closed composite images. The PSF may specify the shape of blur at one or more locations in the FOV.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 and particularly data processing element 116 (FIG. 1) may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for blur-calibration of an imaging sensor, the system having an optical axis in a focus direction, the system comprising:
   a target having a known target pattern comprising a plurality of point-like objects with fixed relative positions, at least one said point-like object having a different focus position in the focus direction along the optical axis;
   a projection element to project at least a portion of the target pattern within a field-of-view (FOV) of the imaging sensor;
   a controller configured to move the target pattern across the FOV; and
   image-capture elements to capture frames of images of the moving target pattern as seen in the FOV of the imaging sensor to sample point-like objects at different focus positions and generate a multi-focal image data output,
   wherein the controller is configured to cause the target pattern to move across the FOV to present the target pattern across different frames at different pixel phases,
   wherein the multi-focal image data output from the image-capture elements is subsequently processed to generate data products at different focus positions from high-resolution composite images generated from the captured frames for the different focus positions.

2. The system of claim 1, wherein said target has a fixed focus position within the test system.

3. The system of claim 2, wherein said test system further comprises a focus adjustment capable of translating one of the target, projection element or imaging sensor to change the target's focus position, said focus adjustment left unchanged to generate the multi-focal image data output.

4. The system of claim 2, wherein said target's fixed focus position is at the focus of the test system.

5. The system of claim 2, wherein said target's fixed focus position is near the focus of the test system so that the point-like objects' different focus positions span the focus of the test system.

6. The system of claim 2, wherein said target's fixed focus position is away from the focus of the test system so that the point-like objects' different focus positions do not span the focus of the test system.

7. The system of claim 1, wherein said target comprises the known target pattern of said plurality of point-like objects with fixed relative positions in an x-y plane across the target surface with a constant position in a z direction perpendicular to the target surface, said target tilted with respect to the system's optical axis to create diversity in the positions of the point-like objects along the optical axis so that at least one said point-like object has a different focus position in the focus direction.

8. The system of claim 1, wherein said target comprises the known target pattern of said plurality of point-like objects with fixed relative positions in an x-y plane across the target surface perpendicular to the optical axis, said target having a non-uniform surface relief in a z direction to create diversity in the positions of the point-like objects along the optical axis so that at least one said point-like object has a different focus position in the focus direction.

9. The system of claim 8, wherein a substantial majority of the point-like objects have the same position in the z direction and same focus position and a few of the point-like objects have a different position in the z direction and different focus positions.

10. The system of claim 9, wherein at least 60% of the point-like objects have the same position in the z direction and same focus position and less than 40% of the point-like objects have a different position in the z direction and different focus positions.

11. The system of claim 10, wherein a data processor processes the high-resolution composite images generated from the substantial majority of point-like objects having the same focus position to generate data products representative of the relative coefficients of the even and odd terms of basis functions that describe an input wavefront associated with said point-like object and wherein the data processor processes the high-resolution composite images generated from the few point-like objects having different focus positions to determine the absolute sign of the even and odd terms.

12. The system of claim 1, wherein a data processor processes the high-resolution composite images for the different focus positions to generate data products representative of absolute coefficients of the even and odd terms of basis functions that describe an input wavefront associated with said point-like objects across the FOV of the imaging sensor.

13. The system of claim 12, wherein the data processor interpolates the absolute coefficients between different regions in the FOV to form a set of coefficients across the FOV, said data processor processing said set of coefficients to generate a point-spread function (PSF) across the FOV.

14. The system of claim 1, wherein a data processor processes the high-resolution composite images for the different focus positions to generate data products representative of a shape of a point-spread function (PSF) for different focus positions.

15. The system of claim 1, wherein a data processor processes the high-resolution composite images for the different focus positions to generate a through-focus curve.

16. A system for blur-calibration of an imaging sensor, the system having a system focus along an optical axis in a focus direction, the system comprising:
   a target positioned at the system focus and having a fixed focus position, said target having a known target pattern comprising a plurality of point-like objects with fixed relative positions, at least one said point-like object having a different focus position in the focus direction along the optical axis;
   a projection element to project at least a portion of the target pattern within a field-of-view (FOV) of the imaging sensor;
   a focus adjustment capable of translating at least one of the imaging sensor, target or projection element along the optical axis to change the focus position of the target, said focus adjustment left unchanged throughout the blur-calibration;
   a controller configured to move the target pattern across the FOV; and
   image-capture elements to capture frames of images of the moving target pattern as seen in the FOV of the imaging sensor to sample point-like objects at different focus positions and generate a multi-focal image data output,
   wherein the controller is configured to cause the target pattern to move across the FOV to present the target pattern across different frames at different pixel phases,
   wherein the multi-focal image data output from the image-capture elements is subsequently processed to generate data products at different focus positions from high-resolution composite images generated from the captured frames for the different focus positions.

17. The system of claim 16, wherein said target comprises the known target pattern of said plurality of point-like objects with fixed relative positions in an x-y plane across the target surface position with a constant position in a z direction perpendicular to the target surface, said target tilted with respect to the system's optical axis to create diversity in the positions of the point-like objects along the optical axis so that at least one said point-like object has a different focus position in the focus direction.

18. The system of claim 16, wherein said target comprises the known target pattern of said plurality of point-like objects with fixed relative positions in an x-y across the target surface plane perpendicular to the optical axis, said target having a non-uniform surface relief in a z direction to create diversity in the positions of the point-like objects along the optical axis so that at least one said point-like object has a different focus position in the focus direction.

19. The system of claim 18, wherein a substantial majority of the point-like objects have the same position in the z direction and same focus position and a few of the point-like objects have a different position in the z direction and different focus positions.

20. A method for generating multi-focal image data output for use in blur-calibration of an imaging sensor, the method comprising:
  moving a known target pattern comprising a plurality of point-like objects with fixed relative positions, at least one said point-like object having a different focus position, across a field-of-view (FOV) of the imaging sensor to present the target pattern across different frames at different pixel phases; and
  capturing frames of images of the moving target pattern as seen in the FOV of the imaging sensor to sample point-like objects at different focus positions and generate a multi-focal image data output,
  wherein the multi-focal image data output is to be subsequently processed to generate data products at different focus positions from high-resolution composite images generated from the captured frames for the different focus positions.

* * * * *